(12) United States Patent
Lee

(10) Patent No.: US 6,971,441 B2
(45) Date of Patent: Dec. 6, 2005

(54) DEVICE AND METHOD FOR REMOVING HEAT FROM OBJECT BY SPRAYING COOLING AGENT

(75) Inventor: Rong-Jung Lee, Tainan (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 288 days.

(21) Appl. No.: 10/384,590

(22) Filed: Mar. 11, 2003

(65) Prior Publication Data

US 2004/0123975 A1    Jul. 1, 2004

(30) Foreign Application Priority Data

Dec. 31, 2002   (TW) ............................... 91137964 A

(51) Int. Cl.[7] ............................................. F28D 15/00
(52) U.S. Cl. ......................... 165/104.22; 165/104.25; 165/104.33
(58) Field of Search ................ 165/104.22, 908, 165/104.25, 104.33

(56) References Cited

U.S. PATENT DOCUMENTS

| | | | | |
|---|---|---|---|---|
| 4,008,755 A | * | 2/1977 | Vandamme | ................. 165/11.1 |
| 5,316,075 A | * | 5/1994 | Quon et al. | .................. 165/908 |
| 5,394,936 A | * | 3/1995 | Budelman | ............... 165/104.33 |
| 5,907,473 A | * | 5/1999 | Przilas et al. | ................ 361/699 |
| 6,349,554 B2 | * | 2/2002 | Patel et al. | ............ 165/104.33 |
| 6,571,569 B1 | * | 6/2003 | Rini et al. | .................. 62/259.2 |
| 6,625,023 B1 | * | 9/2003 | Morrow et al. | ............. 165/908 |
| 2001/0001983 A1 | * | 5/2001 | Kim | ..................... 165/104.33 |
| 2002/0050144 A1 | * | 5/2002 | Patel et al. | ................ 62/259.2 |
| 2002/0075650 A1 | * | 6/2002 | Morris et al. | ................ 165/908 |
| 2002/0170309 A1 | * | 11/2002 | Strauss | ........................ 62/314 |
| 2004/0060313 A1 | * | 4/2004 | Tilton et al. | ............ 165/104.33 |

\* cited by examiner

Primary Examiner—Teresa J. Walberg
(74) Attorney, Agent, or Firm—Rosenberg, Klein & Lee

(57) ABSTRACT

A device and method for removing heat from an object by spraying a cooling agent is disclosed. A cooling casing or a heat sink is mounted to the object. A spray nozzle is arranged to spray the cooling agent onto the cooling casing or the heat sink from a reservoir. The temperature of the object is detected. A controller receives the temperature and issues a signal to drive the spray nozzle when the detected temperature exceeds a predetermined upper temperature limit. The cooling agent is sprayed onto the cooling casing or the heat sink and evaporates by absorbing heat from the cooling casing or the heat sink thereby removing heat from the object. A fan is selectively provided for generating air flows to expel the evaporated cooling agent and thus enhancing heat removal from the object.

18 Claims, 4 Drawing Sheets

DEVICE AND METHOD FOR REMOVING HEAT FROM OBJECT BY SPRAYING COOLING AGENT

BACKGROUND OF THE INVENTION

1. Field of the Invention

The present invention relates generally to a heat removal technique, and in particular to a method for removing heat from an object by controlled spray of a cooling agent onto the object. The present invention also relates to a device for performing the method.

2. Description of the Prior Art

Many electronic devices, such as a computer system, a signal measurement device, data communication device and a control device, consume electrical power when they are in operation. The electrical power that is consumed by the electronic device is converted into thermal energy in part, which leads to a rise of temperature of the electronic device. On the other hand, high temperature may damage sophisticated circuit components of the electronic device. Thus, the heat generated by the operation of the electronic device must be timely removed to prevent the temperature of the electronic device from rising above an acceptable operation range. Heat removal is, therefore, a major concern in designing and manufacturing the electronic devices.

Heretofore, cooling of an electronic device is done by transferring heat to air surrounding the electronic device. For example, heat may be brought away from the electronic device by causing an air flow traveling across or through a heat conductive member, often referred to as "a heat sink", in contact with the electronic device. The heat conductive member is often comprised of a number of spaced fins for increasing surface area from which the heat is transferred to the air flow passing between the fins.

With the rapid development of the electronic industry, power consumption of the electronic device is significantly increased, which means the challenge for timely removing heat from the electronic device is even more severe. Although increasing surface area of the heat sink may enhance the performance of heat removal, the increased surface area indicates an increased volume, which is against the current trend of miniaturization of the electronic device.

SUMMARY OF THE INVENTION

Thus, a primary object of the present invention is to provide a method for removing heat from an object by spraying a cooling agent onto the object whereby heat is efficiently removed from the object by means of the evaporation of the cooling agent.

Another object of the present invention is to provide a method for removing heat from an object by selectively and timely spraying a cooling agent thereto in accordance with temperature detection of the object.

A further object of the present invention is to provide a heat removal control device for spraying a cooling agent onto an object to efficiently remove heat from the object by means of the evaporation of the cooling agent.

To achieve the above objects, in accordance with the present invention, a cooling casing or a heat sink is mounted to an object from which heat is to be removed. A nozzle is positioned above the cooling casing and is connected to a reservoir in which a cooling agent is contained. Temperature of the object is detected and the nozzle is actuated to spray an amount of the cooling agent onto the object when the detected temperature exceeds an upper temperature limit. The cooling agent absorbs and thus removes heat from the object. The reservoir may comprise a detector for detecting abnormality/insufficiency of the cooling agent inside the reservoir. A warning unit may be additionally provided for giving off warnings of the insufficiency and abnormality. A display unit may be incorporated to show the amount of the cooling agent remaining inside the reservoir.

In case the method of the present invention is adopted in a notebook computer, it is desired to use a keyboard controller of the notebook computer to control the operation of heat removal in accordance with the present invention.

In another aspect of the present invention, the cooling casing comprises an open-top heat sink comprising fins onto which the cooling agent is directly sprayed. The cooling agent evaporates and directly diffuses into the surrounding atmosphere.

In accordance with the present invention, an amount of the cooling agent is selectively and timely sprayed onto an object to be cooled down based on result of temperature detection and in accordance with a predetermined control process. The sprayed cooling agent absorbs and thus removes heat from the object to cool the object. Heat can be efficiently removed without a bulky heat sink. In addition, temperature detection and control of cooling operation can be done in a precise manner by means of the automatic control process of the present invention.

BRIEF DESCRIPTION OF THE DRAWINGS

The present invention will be apparent to those skilled in the art by reading the following description of the best mode for carrying out the invention, with reference to the attached drawings, in which.

DETAILED DESCRIPTION OF THE PREFERRED EMBODIMENTS

Figure 1:
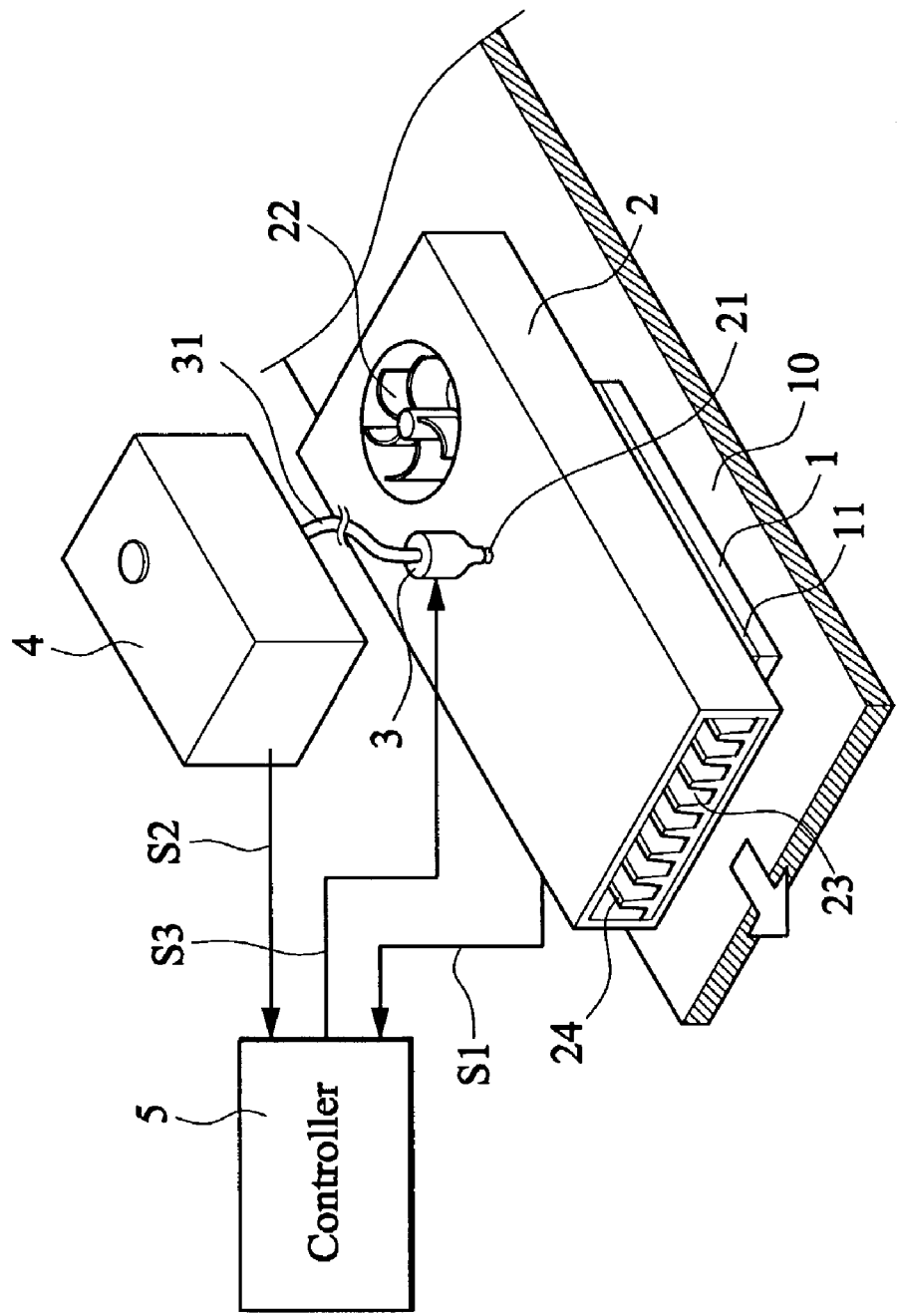
FIG. 1 is a schematic view of a heat removal control device for removing heat from an object in accordance with a first embodiment of the present invention.

With reference to the drawings and in particular to FIG. 1, there is shown a heat removal control device for removing heat from an object in accordance with a first embodiment of the present invention. As illustrated in FIG. 1, a cooling casing 2 is made in the form of a box having a bottom wall (not labeled) and a top wall (not labeled) opposite to the bottom wall. A spray opening 21 is defined in the top wall of the cooling casing 2. Adjacent to the spray opening 21, a fan 22 serving as an air flow generating device is mounted inside the cooling casing 2 to cause air flows through the cooling casing 2. An end of the cooling casing 2 is open and forms a discharge opening 23. A plurality of spaced fins 24 are arranged in the cooling casing 2 and preferably formed on the bottom wall of the cooling casing 2.

The air flows caused by the fan 22 pass through the gaps between the fins 24 of the cooling casing 2 and eventually out of the cooling casing 2 through the discharge opening 23. The cooling casing 2 is mounted to an object 1 from which heat is to be removed with the bottom wall in physical engagement with the object 1. In the embodiment illustrated, the object 1 is a Central Processing Unit (CPU) of a computer system or an electronic device that is mounted on a circuit board 10 and that generates heat in operation.

A spray nozzle 3 is mounted in the spray opening 21 of the cooling casing 2 and is connected to a reservoir 4 via a conduit 31. A cooling agent is stored in the reservoir 4 and is supplied to the spray nozzle 3 via the conduit 31 under the control of a controller 5. The cooling agent that is supplied to the spray nozzle 3 is injected into the cooling casing 2 and sprayed over the fins 24. Preferably, the reservoir 4 can be replenished with the cooling agent to ensure the supply of the cooling agent to the spray nozzle 3 in repeated cycles.

In case that the device and method of the present invention is employed in a notebook computer (not shown), the controller 5 can simply be a keyboard controller of the notebook computer. Alternatively, the controller 5 can be any suitable microprocessor based controlling device.

Figure 2:
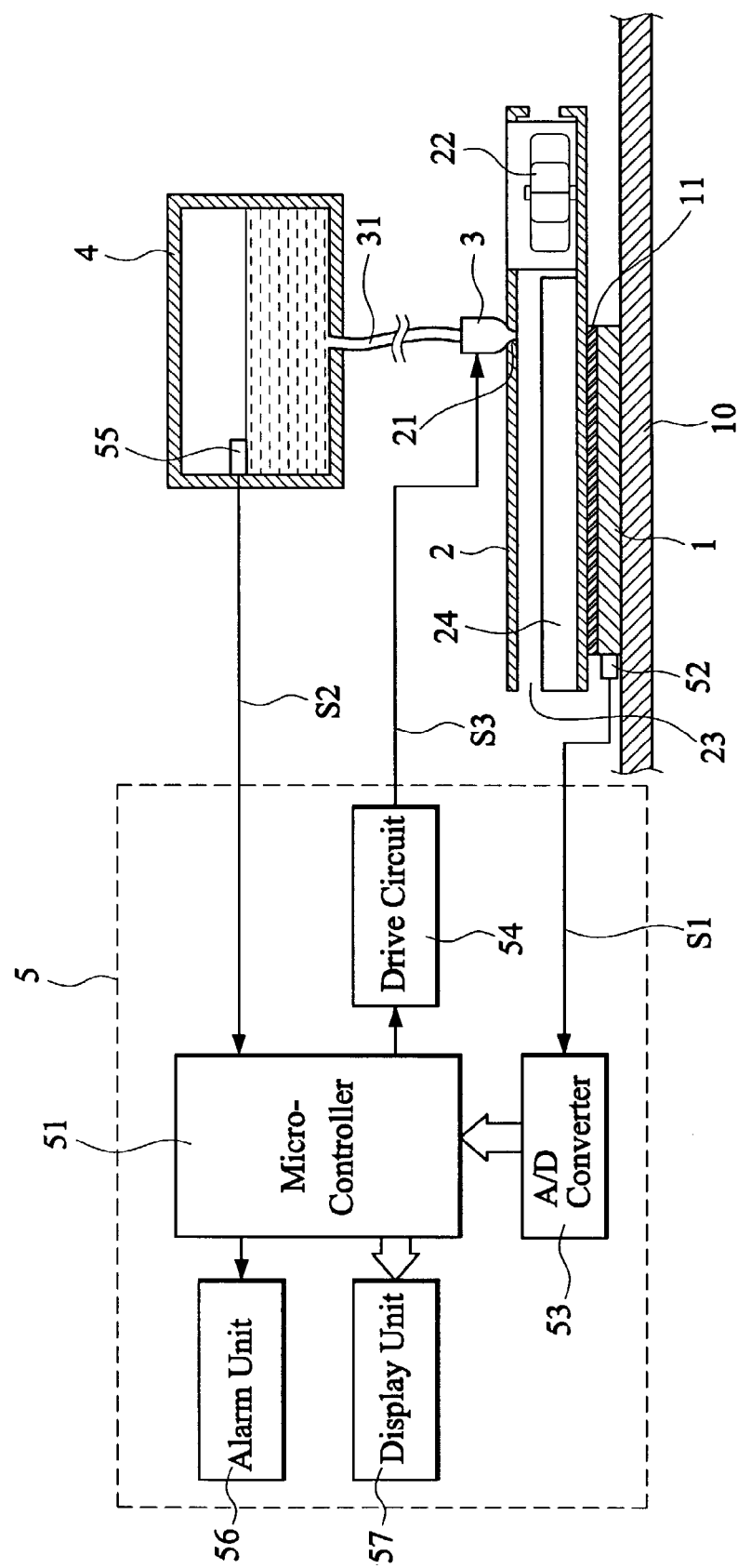
FIG. 2 is a system block diagram of a controller of the heat removal control device of the present invention.

Also referring to FIG. 2, the controller 5 comprises a micro-controller 51, a temperature sensor 52, an analog-to-digital (A/D) converter 53, a drive circuit 54, a cooling agent detector 55 for abnormal/insufficiency conditions, an alarm unit 56 for giving warnings of abnormality and/or insufficiency for the cooling agent inside the reservoir 4 and a display unit 57 for displaying the amount of the cooling agent inside the reservoir 4.

The temperature sensor 52 is mounted to or adjacent to the object 1 to detect the temperature of the object 1. A temperature signal S1 indicating the temperature of the object 1 is transmitted to the analog-to-digital converter 53 and is then converted into a digital signal form that is then applied to the micro-controller 51.

The cooling agent detector 55 is mounted in the reservoir 4 for detecting abnormal conditions and insufficiency of the cooling agent inside the reservoir 4. An abnormality/insufficiency signal S2 is generated by the cooling agent detector 55 and applied to the micro-controller 51. In case an abnormal or insufficient condition is detected by the cooling agent detector 55, an alarm signal is generated by the alarm unit 56 and if desired and necessary, the residual amount of the cooling agent inside the reservoir 4 detected at the abnormality/insufficiency condition is displayed on the display unit 57. The micro-controller 51 is designed or programmed to operate in accordance with the temperature signal S1 and the abnormality/insufficiency signal S2. This will be further discussed.

Preferably, a thermal conductive member 11, such as a thermal conductive pad, is sandwiched between the bottom wall of the cooling casing 2 and the object 1 to ensure efficient and effective heat transfer from the object 1 to the cooling casing 2. The heat transferred from the object 1 to the bottom wall of the cooling casing 2 is then conducted to the fins 24 and brought away from the fins 24 by the air flows generated by the fan 22 and traveling through the gaps between the fins 24.

Although it is shown that the spray opening 21 is defined in the top wall of the cooling casing 2, it is necessary to define the spray opening 21 at a position that allows the cooling agent to be sprayed into the cooling casing 2 in accordance with the location of the fan 22 and the air flows generated by the fan 22 to ensure optimum heat removal rate from the object 1. The cooling agent that is sprayed into the cooling casing 2 evaporates when it is heated by the cooling casing 2 that conducts heat from the object 1. The evaporation of the cooling agent effectively brings heat away from the fins 24 and other portions of the cooling casing 2.

Thus, it is preferred that the cooling agent has a high latent heat of vaporization, which means that it absorbs more heat for one gram of the cooling agent at evaporation. In addition, the cooling agent selected must do no harm to both the device of the present invention and human beings. An example of the cooling agent is a mixture of water and ethyl alcohol. For evaporation at 55° C., one gram of water absorbs an amount of 2.36 KJ of heat, and one gram of ethanol absorbs 0.85 KJ of heat. Different substances have different latent heat and can be used according to requirement. Preferably, the mixed solution is atomized when it is sprayed onto the fins 24. By this means, the cooling agent is evenly sprayed onto the fins 24. This enhances cooling effect realized by the cooling agent. If desired, an additional fragrant component can be added to the cooling agent.

In operation, the micro-controller 51 generates a nozzle drive signal S3 via the drive circuit 54 and applies the nozzle drive signal S3 to the spray nozzle 3. The spray nozzle 3 is thus actuated to spray the cooling agent supplied from the reservoir 4 into the cooling casing 2. Presumably, the reservoir 4 is in operable condition, namely no abnormality/insufficiency signal S2 is issued by the cooling agent detector 55. The temperature sensor 52 detects the temperature of the object 1 and the micro-controller 51 generates the nozzle drive signal S3 when the detected temperature that is indicated by the temperature signal S1 exceeds a predetermined upper temperature limit, such as 70° C. The nozzle 3 is actuated and sprays the cooling agent into the cooling casing 2 and the fins 24 via the spray opening 21. The evaporated cooling agent then entrains the air flows generated by the fan 22 and traveling through the gaps between the fins 24 and is eventually expelled out of the cooling casing 2 via the discharge opening 23. The heat removal rate of the cooling casing 2 is remarkably enhanced by the evaporation of the cooling agent.

Figure 3:
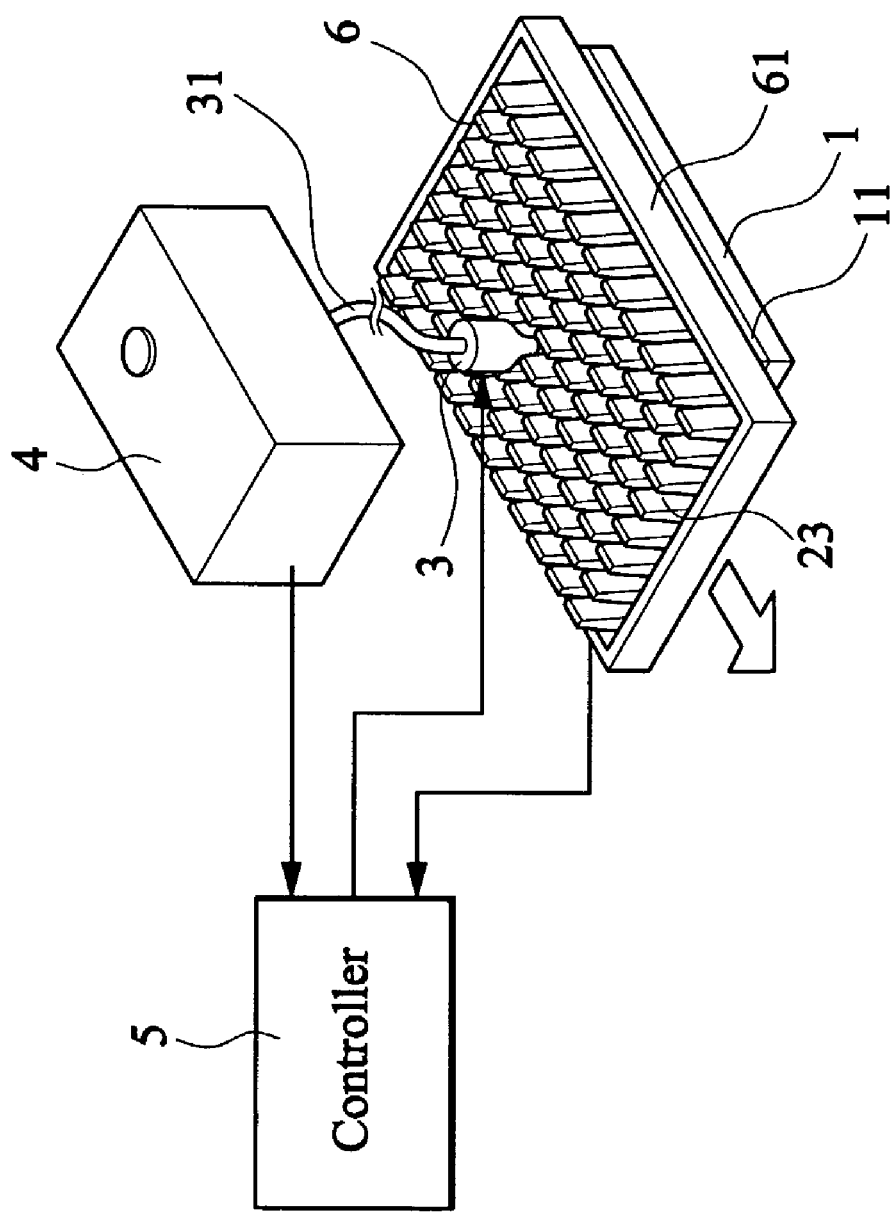
FIG. 3 is a schematic view of a heat removal control device for removing heat from an object in accordance with a second embodiment of the present invention.

Also referring to FIG. 3, a heat removal control device for removing heat from an object in accordance with a second embodiment of the present invention is shown. The cooling casing 2 that has a closed box-like configuration in the previous embodiment is replaced by an open type heat sink having a bottom in thermal contact with the object 1 via the thermal conductive pad 11 and a plurality of open fins 6 extending from the bottom and spaced from each other. A dam wall 61 is formed around the fins 6 to prevent an excessive amount of the cooling agent from flowing out of the heat sink.

Similar to the embodiment discussed with reference to FIGS. 1 and 2, the embodiment shown in FIG. 3 requires the micro-controller 51 to actuate the spray nozzle 3 for timely spraying the cooling agent from the reservoir 4 onto the fins 6 in accordance with the detected temperature of the object 1. The cooling agent evaporates from the fins 6 and thus takes a large amount of heat from the fins 6 whereby removal of heat from the object 1 can be effectively achieved. The evaporated cooling agent diffuses directly into the surrounding atmosphere.

Figure 4:
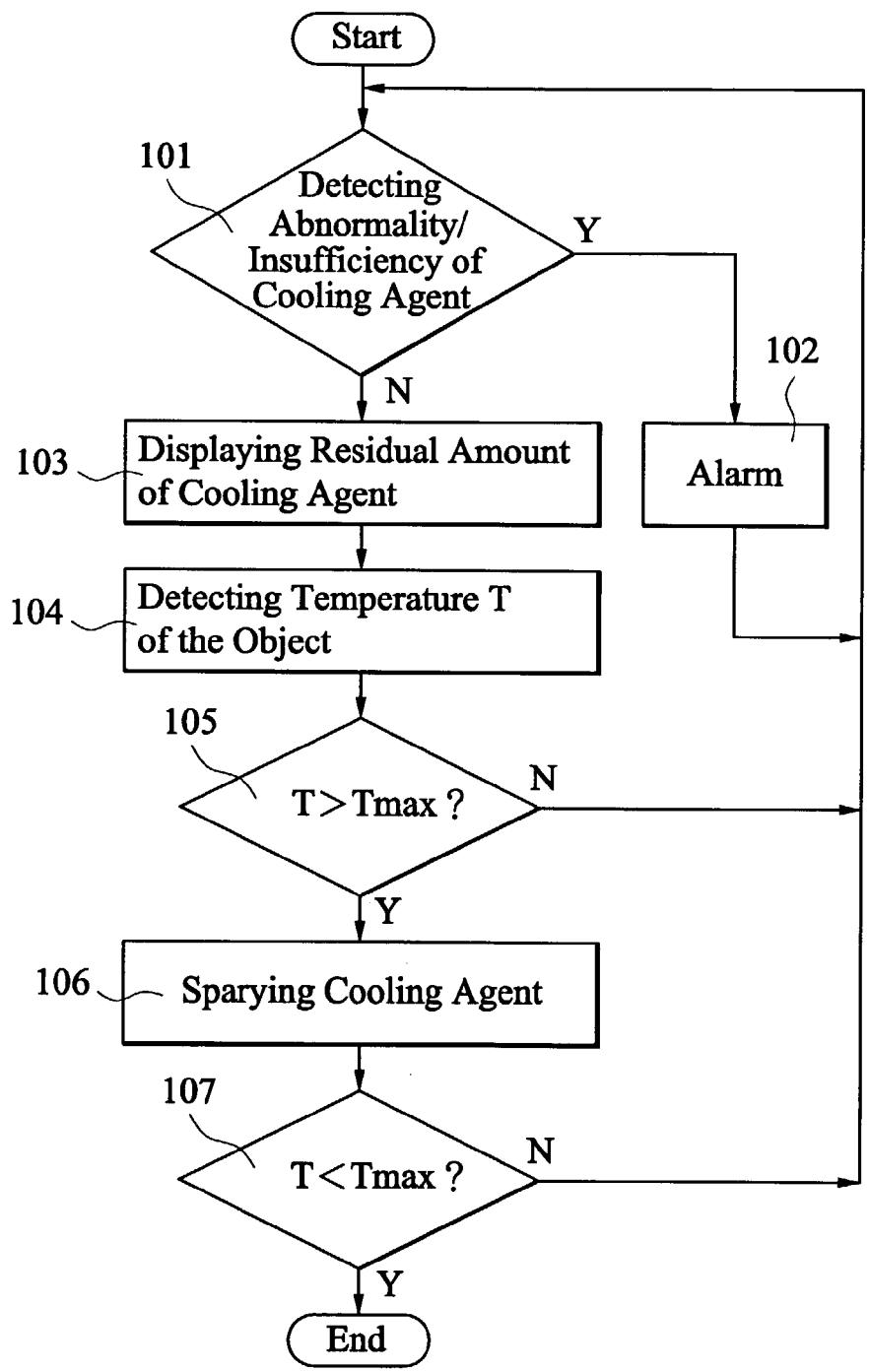
FIG. 4 is a flowchart of a method for removing heat from an object in accordance with the present invention.

FIG. 4 shows a flowchart for the operation of the present invention. In step 101 of the operation process of the present invention, abnormality/insufficiency of the cooling agent is checked first. If abnormality/insufficiency is detected, then an alarm is generated in step 102 by the alarm unit 56. If there is no abnormality and/or insufficiency of the cooling agent inside the reservoir 4, the residual amount of the cooling agent inside the reservoir 4 is displayed by the display unit 57 in step 103. In step 104, the temperature sensor 52 detects the temperature T of the object 1 and issues the temperature signal S1 to the micro-controller 51. The temperature T of the object 1 is compared with a predetermined upper temperature limit Tmax in step 105. If the temperature T is smaller than the upper temperature limit Tmax, the process goes back to step 101 and above described steps 102–105 are repeated.

In case the temperature T exceeds the upper temperature limit Tmax, then the micro-controller 51 issues the nozzle drive signal S3 via the drive circuit 54 to the spray nozzle 3 and the spray nozzle 3 is actuated to spray the cooling agent into the cooling casing 2 (for the embodiment shown in FIGS. 1 and 2) or the heat sink (for the embodiment illustrated in FIG. 3), step 106. In the embodiment illustrated in FIGS. 1 and 2, the air flows generated by the fan 22 expel the evaporated cooling agent out of the cooling casing 2 and also bring the heat from the cooling casing 2. In the embodiment illustrated in FIG. 3, the evaporated cooling agent is simply allowed to diffuse into the surrounding atmosphere.

After the cooling agent is sprayed onto the cooling casing 2, the temperature T of the object 1 is compared with the upper temperature limit Tmax again, step 107. If the temperature T gets below the upper temperature limit Tmax, then the process ends. If the temperature T does not go below the upper temperature limit Tmax, then the process goes back to step 101 and is repeated again until the temperature T eventually gets below the upper temperature limit Tmax.

Although the present invention has been described with reference to the preferred embodiments of the device thereof and the best modes of operation thereof, it is apparent to those skilled in the art that a variety of modifications and changes may be made without departing from the scope of the present invention which is intended to be defined by the appended claims.

What is claimed is:

1. A device for removing heat from an object to be cooled down with a cooling agent comprising:

a longitudinally extended cooling casing having a wall thereof mounted on the object for receiving heat transferred from the object, the cooling casing having a longitudinally directed passageway extending therethrough and a plurality of longitudinally extended fins formed in the passageway;

a fan disposed adjacent one end of said passageway for generating an airflow therethrough to a discharge opening disposed at an opposing end of said passageway;

a spray nozzle arranged to spray an amount of the cooling agent onto the fins of the cooling casing;

a reservoir containing the cooling agent and supplying the cooling agent to the spray nozzle;

a cooling agent detector disposed in the reservoir for sensing an amount of the cooling agent therein; and, a controller having a display unit and being operatively coupled to the spray nozzle and adapted to detect a temperature signal indicating a temperature of the object for selectively actuating the spray nozzle to spray the cooling agent onto the fins of the cooling casing to remove heat therefrom responsive to the temperature of the object exceeding an upper temperature limit, the controller being coupled to the cooling agent detector for receiving signals therefrom and the display unit displaying an amount of the cooling agent within the reservoir responsive to the signals received from the cooling agent detector.

2. The device as claimed in claim 1, wherein the controller comprises:

a micro-controller;

an analog-to-digital converter adapted to receive and convert the temperature signal into a digital signal applied to the micro-controller; and a drive circuit arranged between the micro-controller and the spray nozzle whereby the drive circuit is controlled by the micro-controller to provide a nozzle drive signal to actuate the spray nozzle.

3. The device as claimed in claim 1, wherein the controller further comprises an alarm unit for generating an alarm signal responsive to said signals from said cooling agent detector indicating an abnormality/insufficiency condition of the cooling agent.

4. The device as claimed in claim 1, wherein the object comprises a central processing unit of a computer system.

5. The device as claimed in claim 1, further comprising a thermal conductive member sandwiched between the cooling casing and the object.

6. The device as claimed in claim 1, wherein the reservoir comprises a rechargeable structure allowing for replenishment of the cooling agent.

7. The device as claimed in claim 1, wherein the cooling agent comprises a mixture of water and ethyl alcohol.

8. The device as claimed in claim 1, wherein the cooling agent comprises an additional fragrant component.

9. A device for removing heat from an object to be cooled down with a cooling agent comprising:

a heat sink comprising a plurality of fins mounted to the object for receiving heat transferred from the object;

a spray nozzle arranged to spray an amount of the cooling agent onto the heat sink;

a reservoir containing the cooling agent and supplying the cooling agent to the spray nozzle;

a cooling agent detector disposed in the reservoir for sensing an amount of the cooling agent therein; and, a controller having a display unit and being operatively coupled to the spray nozzle and adapted to detect a temperature signal indicating a temperature of the object for selectively actuating the spray nozzle to spray the cooling agent onto the heat sink to remove heat therefrom responsive to the temperature of the object exceeding an upper temperature limit, the controller being coupled to the cooling agent detector for receiving signals therefrom and the display unit displaying an amount of the cooling agent within the reservoir responsive to the signals received from the cooling agent detector.

10. The device as claimed in claim 9, wherein the controller comprises:

a micro-controller;

an analog-to-digital converter adapted to receive and convert the temperature signal into a digital signal applied to the micro-controller; and a drive circuit arranged between the micro-controller and the nozzle whereby the drive circuit is controlled by the micro-controller to provide a nozzle drive signal to actuate the spray nozzle.

11. The device as claimed in claim 9, wherein the controller further comprises an alarm unit for generating an alarm signal responsive to said signals from said cooling agent detector indicating an abnormality/insufficiency condition of the cooling agent.

12. The device as claimed in claim 9, wherein the object comprises a central processing unit of a computer system.

13. The device as claimed in claim 9, wherein the cooling agent comprises a mixture of water and ethyl alcohol.

14. The device as claimed in claim 9, wherein the cooling agent comprises an additional fragrant component.

15. The device as claimed in claim 9, wherein the heat sink comprises a dam wall for preventing excessive amount of the cooling agent from flowing out of the heat sink.

16. A method for removing heat from an object to be cooled down with a cooling agent comprising the following steps:
- (a) detecting an amount of a cooling agent in a reservoir;
- (b) displaying the amount of the cooling agent in the reservoir;
- (c) initiating an alarm if the amount of cooling agent in the reservoir is at an insufficient level;
- (d) detecting a temperature of the object;
- (e) spraying the cooling agent onto a cooling device mounted to the object for removing heat from the object responsive to the temperature of the object exceeding an upper temperature limit; and
- (f) repeatedly detecting the temperature of the object and repeatedly spraying the cooling agent onto the cooling device until the temperature of the object is below the upper temperature limit.

17. The method as claimed in claim 16 further comprising a step of generating an air flow by a fan to bring away evaporated cooling agent that is evaporated by the heat from the object.

18. The method as claimed in claim 16, wherein the step of spraying includes the step of atomizing the cooling agent.

* * * * *